(12) United States Patent
McMullen et al.

(10) Patent No.: US 9,225,801 B1
(45) Date of Patent: Dec. 29, 2015

(54) MULTI-TENANT NETWORKING

(71) Applicant: SolidFire, Inc., Boulder, CO (US)

(72) Inventors: Marshall McMullen, Boulder, CO (US); Peter P. Waskiewicz, Jr., Boulder, CO (US)

(73) Assignee: SolidFire, Inc., Boulder, CO (US)

( * ) Notice: Subject to any disclaimer, the term of this patent is extended or adjusted under 35 U.S.C. 154(b) by 0 days.

(21) Appl. No.: 14/684,914

(22) Filed: Apr. 13, 2015

Related U.S. Application Data

(63) Continuation of application No. 14/529,474, filed on Oct. 31, 2014.

(51) Int. Cl.
| | |
|---|---|
| *G06F 15/16* | (2006.01) |
| *H04L 29/06* | (2006.01) |
| *H04L 29/12* | (2006.01) |
| *H04L 12/931* | (2013.01) |
| *H04L 12/751* | (2013.01) |
| *H04L 12/801* | (2013.01) |
| *H04L 29/08* | (2006.01) |

(52) U.S. Cl.
CPC .......... *H04L 67/42* (2013.01); *H04L 29/08072* (2013.01); *H04L 45/02* (2013.01); *H04L 47/10* (2013.01); *H04L 49/354* (2013.01); *H04L 61/2007* (2013.01); *H04L 61/255* (2013.01)

(58) Field of Classification Search
CPC .... H04L 29/08072; H04L 47/10; H04L 47/31
USPC ........................... 709/232, 238; 370/392, 401
See application file for complete search history.

(56) References Cited

U.S. PATENT DOCUMENTS

| | | | |
|---|---|---|---|
| 6,604,155 B1 | 8/2003 | Chong, Jr. | |
| 7,701,948 B2 * | 4/2010 | Rabie et al. | 370/395.41 |
| 8,089,969 B2 * | 1/2012 | Rabie et al. | 370/395.41 |
| 2003/0028642 A1 | 2/2003 | Agarwal et al. | |
| 2004/0107281 A1 | 6/2004 | Bose et al. | |
| 2004/0133622 A1 | 7/2004 | Clubb et al. | |
| 2006/0129676 A1 * | 6/2006 | Modi et al. | 709/227 |
| 2006/0165074 A1 * | 7/2006 | Modi et al. | 370/389 |
| 2011/0238857 A1 | 9/2011 | Certain et al. | |
| 2012/0124282 A1 | 5/2012 | Frank et al. | |
| 2012/0317353 A1 | 12/2012 | Webman et al. | |
| 2012/0317395 A1 | 12/2012 | Segev et al. | |
| 2013/0124776 A1 | 5/2013 | Hallak et al. | |
| 2013/0173955 A1 | 7/2013 | Hallak et al. | |
| 2013/0305002 A1 | 11/2013 | Hallak et al. | |
| 2015/0085665 A1 * | 3/2015 | Kompella et al. | 370/236 |

* cited by examiner

*Primary Examiner* — Khanh Dinh
(74) *Attorney, Agent, or Firm* — Foley & Lardner LLP

(57) ABSTRACT

Methods, systems, and apparatuses, including computer programs encoded on computer-readable media are disclosed for binding a process to a wildcard address and a port on a plurality of nodes of a cluster. A process receives a first request for a first address of a first volume that is sent to the port and a first address associated with a first virtual local area network that is not the wildcard address. The process determines the first address, a name of the first VLAN, and a first node that contains information regarding the first volume. The process determines an address of the first node that is part of the first VLAN. The address of the first node is returned. The process receives another request for a second address of a second volume that is sent to the port and a second address associated with another VLAN that is not the wildcard address.

20 Claims, 3 Drawing Sheets

MULTI-TENANT NETWORKING

CROSS-REFERENCE TO RELATED APPLICATIONS

The present application is a continuation of U.S. patent application Ser. No. 14/529,474, filed Oct. 31, 2014, the entire contents of which are incorporated herein by reference in its entirety.

BACKGROUND

Virtual local area networks (VLANs) allow various remote-computing systems to communicate as if they resided on a common local area network. Accordingly, network security measures can ensure secure communication occurs between the various remote-computing systems, even if the communication occurs over an otherwise unsecured network. Combined with a VLAN, internet small computer system interface (iSCSI) allows volumes on a storage system to be accessed in a secure way. iSCSI provides an abstraction of where a volume of data is stored on the storage system. To create a connection, a device issues a discovery request for a particular volume to an iSCSI target. In response to this discovery request, the iSCSI target determines where the volume is located and provides the IP address of where the volume is located. This allows an end user to access a volume of data without having to know, prior to accessing the data, where the data is actually located. This process is called iSCSI redirection. Computing resources are needed to support iSCSI redirection. Each VLAN must support iSCSI redirection, which increases the amount of resources needed by the number of VLANs the storage system supports. Due to the amount of resources needed to support multiple VLANs, supporting a large number of VLANs on one storage system becomes an issue.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims. Like reference numbers and designations in the various drawings indicate like elements.

DETAILED DESCRIPTION

Figure 1:
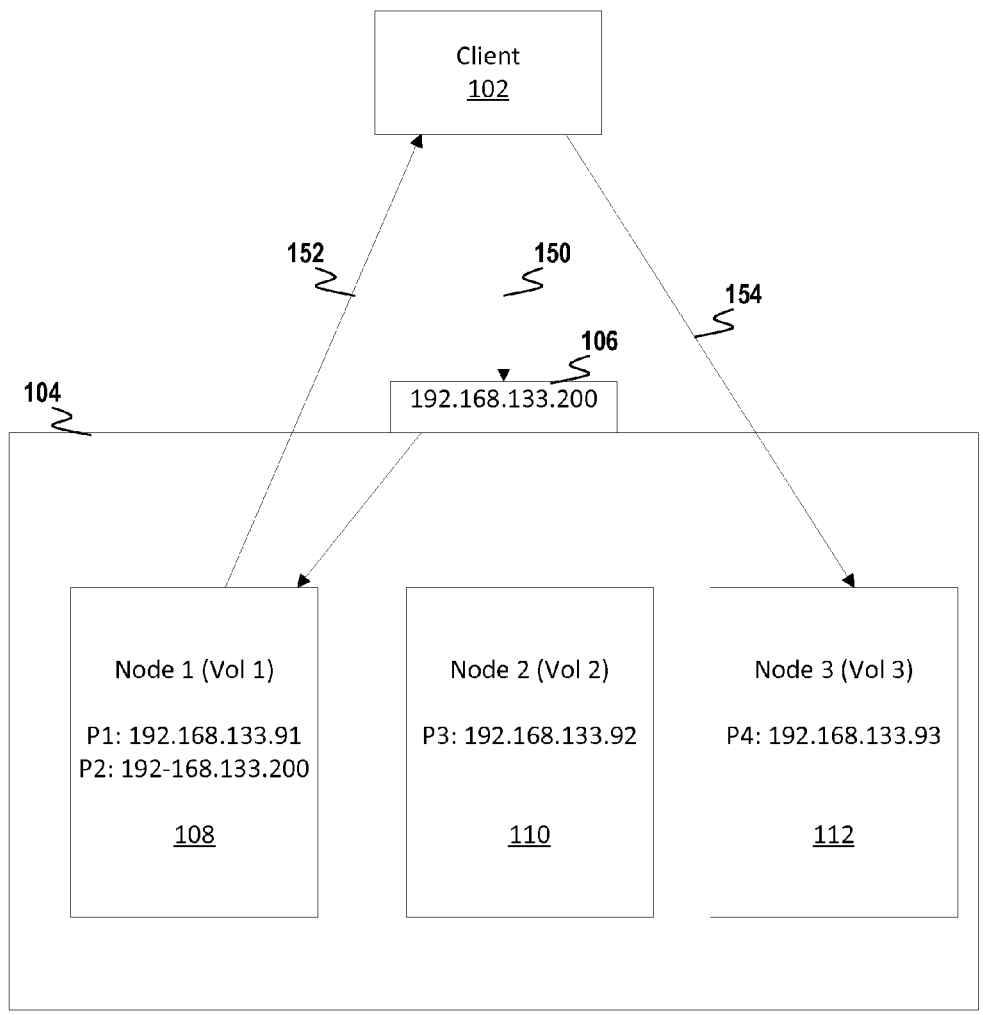
FIG. 1 depicts a storage system supporting iSCSI redirection.

FIG. 1 depicts a storage system 104 supporting iSCSI redirection. The storage system 104 includes nodes 108, 110, and 112. Each node can contain information about one or more volumes of data. For example, node 3 112 includes data associated with a volume 3. This data can include information regarding where data stored on the volume is located. The volume's data can be stored across different nodes. In one implementation, the volume's data is stored randomly across all nodes of the storage system 104. Multiple different clients can access the storage system. These clients can be independent of one another. Data associated with each client, therefore, is inaccessible by other clients. One way to ensure that client data stays separate from one another is to use a separate VIP for each client. In this implementation, each VIP is for a cluster of nodes. While the nodes used in various client clusters can overlap, the data stay separated due to the use of different VIPs. For example, a client that accesses the cluster using VIP 106 would not be able to authenticate with a different VIP (now shown in FIG. 1). Accordingly, the client would only be able to access volumes on the cluster associated with the client.

Each volume can be accessed using iSCSI. An end user can use a computing device 102 to access a volume associated with the end user. For example, the client 102 can access volume 3. To do this, the client must now know an IP address 106 that is associated with the storage system 104. A virtual IP address (VIP) is used for this purpose. This IP address is considered to be virtual as the physical device that receives data destined to the VIP changes. An iSCSI initiator, such as the client 102, initially connects to the VIP address 106 as an endpoint. To support iSCSI functions, the VIP address 106 has responsibility for handling all initial iSCSI requests from multiple clients. The actual node or other computing system that is the actual physical destination of this address can change. For example, the hosting computing device can be changed to balance the load from handling iSCSI functions. Importantly, only a single node will host the VIP at any one time. Whichever node handles data received on the VIP listens on a defined port, e.g., 3260, on the VIP for incoming iSCSI requests.

Allowing various nodes to act as the endpoint of the VIP ensures that if the node that is currently hosting the VIP crashes another node can become the VIP. From the customer's perspective, the VIP is always available and the customer does not have to know which node is acting as the VIP. Accordingly, the VIP is the address that the client 102 uses to connect to iSCSI storage.

One function of the VIP is to direct a client to the node that stores a requested volume. This allows a volume to reside on a different node than the node currently acting as VIP. For example, FIG. 1 illustrates the client 102 requesting access to volume 3. Initially, the client 102 sends a request to the VIP (150). In FIG. 1, node 108 is acting as the VIP so the request is handled by node 108. Node 1 determines which node handles I/O requests for volume 3. For example, a database can store a mapping of volume names to node names or IP addresses. In this example, node 112 handles I/O requests for volume 3. Accordingly, node 108 sends a redirect response to the client 102 that includes the IP address of node 112, e.g., 192.168.133.93, and port that accepts iSCSI commands for volume 3 (152). Upon receipt, the client 102 then performs a new login directly to node 112 (154).

Figure 2:
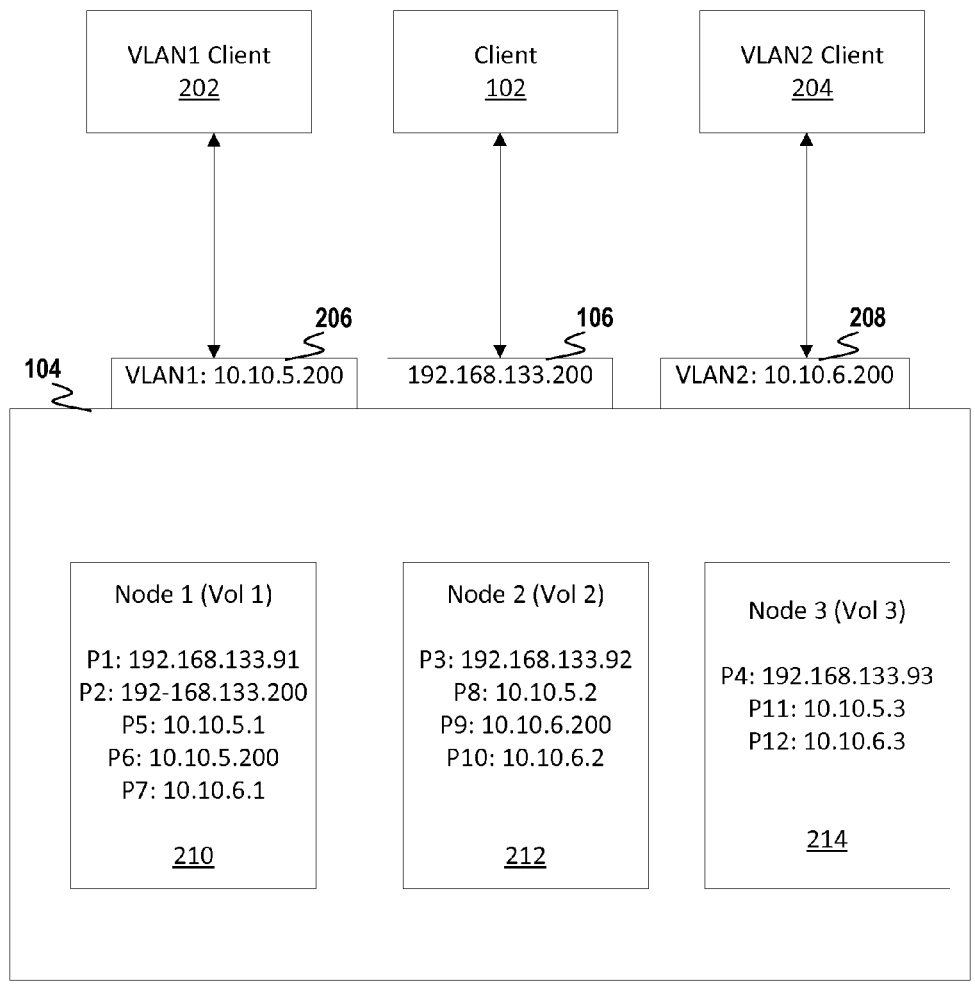
FIG. 2 depicts a storage system supporting iSCSI redirection with multiple VLANs.

This redirection involves two separate types of processes. The first is the VIP process. The second type of process is the process that listens for iSCSI commands that occur on a particular network. In FIG. 1, each node has one process that acts as the iSCSI listening process. Each process listens for iSCSI commands to access volumes that the node hosts. If a particular volume is not hosted on the current node, the node can redirect an iSCSI initiator to the correct node. Note, this is different than the VIP process that redirects iSCSI initiators to the correct node. Rather, each iSCSI listening process can also redirect iSCSI initiators to account for volumes that move from one node to another node. Accordingly, one main difference between the two types of processes is that each iSCSI listening process is not intended to be a redirector process that all clients initially communicate. The VIP process is the process that all clients initially connect to when trying to access a particular volume.

iSCSI redirection can be used in combination with VLANs. FIG. 2 depicts a storage system 204 supporting iSCSI redirection with multiple VLANs. Specifically, the storage system 204 includes three different iSCSI endpoints, VLAN1, a cluster, and VLAN2. A client 202 can use VIP 106 to access volumes on the client's cluster. This is accomplished as described in FIG. 1. In contrast to FIG. 1, FIG. 2 includes two VLANs. Each VLAN is required to have a dedicated VLAN network interface configured on every node with a dedicated VLAN IP address specific to that VLAN. Different network interfaces for each VLAN ensures that packets from different networks are isolated from one another. All incoming and outgoing traffic for a VLAN must come in and go out over the dedicated interface and IP address associated with that VLAN. In addition, VLAN traffic cannot see non-VLAN traffic or traffic on a different VLAN. To ensure this separation of VLAN data, FIG. 2 adds two additional VIPs, one for VLAN1 206 and one for VLAN2 208. Accordingly, a VLAN1 client 202 can access its cluster using VIP 206. Similarly, a VLAN2 client 204 can access its cluster using VIP 208.

In addition to adding VIPs 206 and 208, each node must also include one iSCSI listening process for each VLAN. A VIP process is also needed for each VLAN. In FIG. 2, processes P1, P3, and P4 are the iSCSI listening processes for a cluster of nodes. Processes P5, P8, and P11 are the iSCSI listening processes for VLAN1, while P7, P10, and P12 are the iSCSI listening processes for VLAN2. P2 on node 210, P6 on node 210, and P9 on node 212 are the VIP processes for the cluster, VLAN1, and VLAN2, respectively.

The approach shown in FIG. 2 segregates traffic from different VLANs using separate processes. Adding a new VLAN, therefore, increases the number of processes that operate on each node. For a small number of VLANs, this does not pose difficulty. A large number of supported VLANs, e.g., 100s or 1,000s, however, begin to tax system resources significantly. The large number of processes can lead to contention issues as well as extensive memory overhead. Further, each process requires additional threads and sockets. Further, adding and deleting VLANs is also a problem. A storage system with a large number of nodes requires that a process be added to each of the nodes. This makes adding VLANs dynamically unworkable. For example, race conditions would be common in trying to atomically create a process on each of the nodes. Further, how IP addresses are apportioned also becomes an issue.

Figure 3:
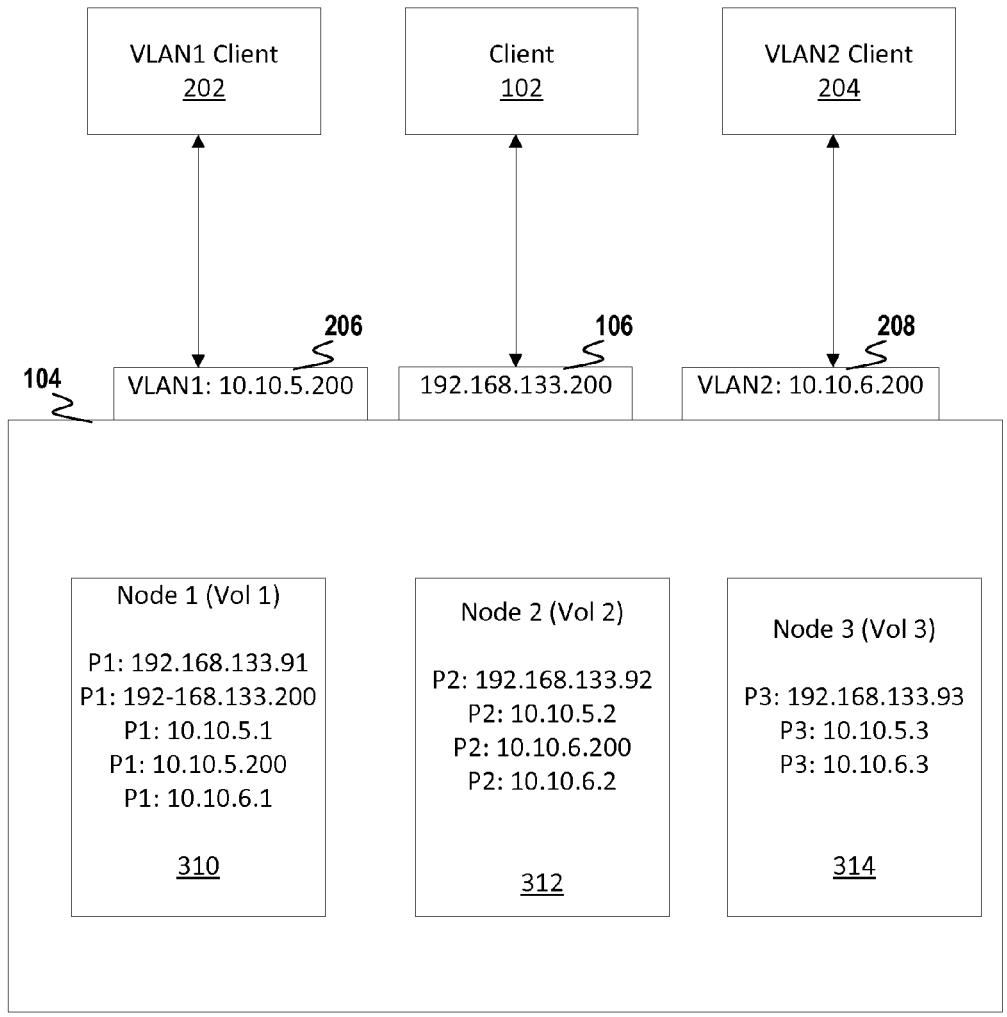
FIG. 3 depicts a storage system supporting iSCSI redirection with multiple VLANs according to one embodiment.

FIG. 3 depicts a storage system supporting iSCSI redirection with multiple VLANs according to one embodiment. In FIG. 3, a single wildcard process exists on each node. This process operates as a VIP for any VLAN or cluster, and an iSCSI listening process for every cluster and VLAN. To achieve this is to use an IP address that is bound to every interface of a machine. For example, the IPADDR_ANY IP address can be used, e.g., 0.0.0.0 or ::. In this way, one process listens across all network interfaces of a machine on a particular socket, e.g., 3260. In various implementations, the iSCSI traffic uses different IP addresses to differentiate between VLANs but uses the same port. If different ports are used, one process is needed for every distinct port. The IPADDR_ANY IP address acts as a wildcard address that a process can listen on so that the process will receive all packets destined for any interface on a particular port on the machine. The physical and virtual interfaces, however, are still separate. Incoming traffic into a node still stays on its own interface. Only at the final layer in the kernel is all of the incoming traffic collapsed down to the one process listening on the one socket bound to IPADDR_ANY. The VLAN requirement that data is segregated across different VLANS, therefore, is achieved.

Using the IPADDR_ANY address, therefore, allows a single process to run on every node. This one process handles all cluster and VLAN traffic. In addition, the iSCSI listening process can also be combined with the VIP process. Accordingly, regardless of how many VLANs are supported in the storage system, each node only has a single process. This one process also handles all non-VLAN packets. Note, each VLAN and cluster has its own unique IP address that is used by external clients to access volumes on a VLAN or cluster.

As noted above, the approach illustrated in FIG. 3 keeps VLAN traffic properly segregated. Accordingly, the security of any VLAN is maintained. No customer iSCSI data passes over the unfiltered catch-all wildcard interface and socket. As the wildcard interface can receive data related to different VLANs, the wildcard process must determine how to properly handle iSCSI requests and data. A database can be used to store data used to properly route packets. The database can include data about each volume and node in the storage system. Using this information, the redirector portion of the wildcard process can lookup which node is hosting that volume. Next, all of the IP addresses of that node can be determined.

Repeating the example from FIG. 1, a client can log in to volume 3. A discovery request is sent from VLAN1 client to access volume 3. The client sends the packet to VLAN1's IP address 10.10.5.200. If node 1 is the VIP of VLAN1, the discovery request is handled by the one wildcard process running on node 1. Volume 3 is located on node 3. The issue, though, is what IP address should be returned, as node 3 is addressable by three IP address: 192.168.133.93 for the cluster; 10.10.5.3 for VLAN1; and 10.10.6.3 for VLAN2. Previously, there was one process for each interface. Accordingly, the return address would be known as there was one process for each VLAN, e.g., for each of the three IP address. Now, as there is a single process running, the correct IP address to return must be determined.

To determine the correct IP address to return, the local endpoint that the packet arrived on can be determined. For example, a getsockname( ) method call can be made. In the example above, the traffic was received on VLAN1's VIP, so 10.10.5.200 would be returned. Using this information, the name of the VLAN can be determined from the database. In addition, volume 3 can be determined to be located on node 3. Next, using the name of the VLAN, the IP address on node 3 associated with VLAN1 can be determined, i.e., 10.10.5.3. This is the address that is returned to the client. The client can then connect directly to 10.10.5.3 to access volume 3.

When the client accesses data in volume 3, the wildcard process handles the IO requests. As these requests are not iSCSI discovery requests, an iSCSI listener counterpart of the wildcard process processes the request. This portion of the wildcard process determines the IP address that the client used to connect to node 3. Using this information, the wildcard process can verify that the client is able to connect to the VLAN.

In addition to the reduction of processes needed to support VLANs, the various implementations allow VLANs to be atomically configured. To add a VLAN to a cluster, one or more blocks of IP addresses are received from a client device. For example, a VLAN setup process can receive the block of IP addresses. In addition, a name of the new VLAN and requested VIP of the VLAN can be received. The IP addresses are used to assign to each node one IP address. Each IP address associated with the new VLAN cannot be currently in use in the cluster. To ensure that the VLAN can be created, all currently used IP addresses in the block of IP addresses can be filtered or marked as being in use. The number of unused IP addresses can then be determined. If the number of unused IP addresses is less than the number of nodes in the cluster, the VLAN cannot be setup. In this scenario, a message indicating that a different block of IP addresses is required to setup the VLAN can be returned to the client device. If the number of IP addresses is greater than or equal to the number of nodes in the cluster, the setup of the VLAN can continue, A database that supports atomic functions is used to atomically setup the VLAN. The IP address assigned to each node and an identifier of the node are stored in the database. This allows the IP address for this VLAN to be determined for each node in the cluster. This atomic feature ensures that if nodes are added to a cluster at the same time a VLAN is being added, the VLAN will be successfully setup with the new node. If the VLAN is not at first successfully installed because a new node was added before the VLAN was successfully added, attempting to add the new VLAN can be retried. In this scenario, as long as no new node was added, an existing node is removed, or using one IP address is duplicated, the adding will be successful. Once a VLAN is added to the database, network interfaces for each node can be created and bound to the appropriate port. In addition, the VIP of the VLAN is bound to an initial node and listens for iSCSI discovery requests on the new VLAN.

Another benefit of this configuration is that numerous different clients can use the storage system. A single client can itself have multiple customers. The client, however, may need to ensure that each customer's data is separate and secure from each other customer. This can be accomplished by providing each customer with its own VLAN. As described above, data in one VLAN is segmented from data in each and every other VLAN.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method comprising:
   binding, using a plurality of processors, a process to a wildcard address and a port on each of a plurality of nodes that are part of a cluster;
   receiving, by the process on a redirector node, a first request for a first address of a first volume located on the cluster from a first client, wherein the first request is sent to the port and a first address associated with a first virtual local area network (VLAN) that is not the wildcard address;

determining, by the process on the redirector node, the first address from the first request;

determining, by the process on the redirector node, a name of the first VLAN based on the first address;

determining, by the process on the redirector node, a first node that contains information regarding the first volume;

determining, by the process on the redirector node, an address of the first node that is part of the first VLAN based upon the name of the first VLAN;

returning, by the process on the redirector node, the address of the first node to the first client; and receiving, by the process on the redirector node, a second request for a second address of a second volume located on a cluster that contains a plurality of nodes from a second client, wherein the second request is sent to a second address associated with a second VLAN that is not the wildcard address.

2. The method of claim 1, further comprising:
determining, by the process on the redirector node, the second address from the second request;
determining, by the process on the redirector node, a name of the second VLAN;
determining, by the process on the redirector node, a second node that contains information regarding the second volume;
determining, by the process on the redirector node, an address of the second node that is part of the second VLAN based upon the name of the second VLAN; and
returning, by the process on the redirector node, the address of the second node to the second client.

3. The method of claim 1, further comprising:
receiving a plurality of addresses for a new VLAN;
removing any of the plurality of addresses that are already assigned to one of the plurality of nodes;
determining the number of unused addresses is greater than or equal to the number of nodes in the plurality of nodes;
assigning one of the remaining plurality of addresses to each node of the plurality of nodes;
updating in an atomic operation, using a database, a mapping of the assigned addresses to the assigned node; and
creating, on each of the plurality of nodes, a network interface associated with the new VLAN.

4. The method of claim 1, further comprising receiving, at the process on the first node, a request from a first client to access the first volume.

5. The method of claim 4, wherein the redirector node is the first node.

6. The method of claim 4, wherein the redirector node is different from the first node.

7. The method of claim 1, wherein the first request is an iSCSI discovery request.

8. The method of claim 1, where the first address is an internet protocol address.

9. A system comprising:
a cluster comprising a plurality of nodes, including a redirector node, wherein each node comprises:
a process bound to a wildcard address and a port;
the redirector node, wherein the process on the redirector node is configured to:
receive a first request for a first address of a first volume located on the cluster from a first client, wherein the first request is sent to the port and a first address associated with a first virtual local area network (VLAN) that is not the wildcard address;
determine the first address from the first request;
determine a name of the first VLAN based on the first address;
determine a first node that contains information regarding the first volume;
determine an address of the first node that is part of the first VLAN based upon the name of the first VLAN;
return the address of the first node to the first client; and
receive a second request for a second address of a second volume located on a cluster that contains a plurality of nodes from a second client, wherein the second request is sent to a second address associated with a second VLAN that is not the wildcard address.

10. The system of claim 9, wherein the process on the redirector node is further configured to:
determine the second address from the second request;
determine a name of the second VLAN;
determine a second node that contains information regarding the second volume;
determine an address of the second node that is part of the second VLAN based upon the name of the second VLAN; and
return the address of the second node to the second client.

11. The system of claim 9, further comprising:
a database configured to store information regarding the nodes and volumes of the cluster; and
a processor configured to:
receive a plurality of addresses for a new VLAN;
remove any of the plurality of addresses that are already assigned to one of the plurality of nodes;
determine the number of unused addresses is greater than or equal to the number of nodes in the plurality of nodes;
assign one of the remaining plurality of addresses to each node of the plurality of nodes;
update in an atomic operation, using the database, a mapping of the assigned addresses to the assigned node; and
create, on each of the plurality of nodes, a network interface associated with the new VLAN.

12. The system of claim 9, wherein the process on the first node is configured to receive a request from a first client to access the first volume.

13. The system of claim 12, wherein the redirector node is the first node.

14. The system of claim 12, wherein the redirector node is different from the first node.

15. The system of claim 9, wherein the first request is an iSCSI discovery request.

16. The system of claim 9, where the first address is an internet protocol address.

17. A non-transitory computer-readable storage medium containing instructions for controlling a computer system to perform operations comprising:
binding a process to a wildcard address and a port on a redirector node that is part of a cluster;
receiving, by the process on the redirector node, a first request for a first address of a first volume located on the cluster from a first client, wherein the first request is sent to the port and a first address associated with a first virtual local area network (VLAN) that is not the wildcard address;
determining, by the process on the redirector node, the first address from the first request;

determining, by the process on the redirector node, a name of the first VLAN based on the first address;

determining, by the process on the redirector node, a first node that contains information regarding the first volume;

determining, by the process on the redirector node, an address of the first node that is part of the first VLAN based upon the name of the first VLAN;

returning, by the process on the redirector node, the address of the first node to the first client; and receiving, by the process on the redirector node, a second request for a second address of a second volume located on a cluster that contains a plurality of nodes from a second client, wherein the second request is sent to a second address associated with a second VLAN that is not the wildcard address.

18. The non-transitory computer-readable storage medium of claim 17, wherein the operations further comprise:

determining, by the process on the redirector node, the second address from the second request;

determining, by the process on the redirector node, a name of the second VLAN;

determining, by the process on the redirector node, a second node that contains information regarding the second volume;

determining, by the process on the redirector node, an address of the second node that is part of the second VLAN based upon the name of the second VLAN; and returning, by the process on the redirector node, the address of the second node to the second client.

19. The non-transitory computer-readable storage medium of claim 17, wherein the operations further comprise receiving, at the process on the redirector node, a request from a first client to access the first volume.

20. The non-transitory computer-readable storage medium of claim 17, wherein the first request is an iSCSI discovery request.

\* \* \* \* \*